April 1, 1958 H. PITLIK 2,829,203
ELECTRONIC TELEPHONE SUBSCRIBER'S LINE CIRCUIT FOR NEUTRALIZING THE EFFECTS OF LONGITUDINAL INDUCTION AND LONGITUDINAL UNBALANCE
Filed Nov. 3, 1955
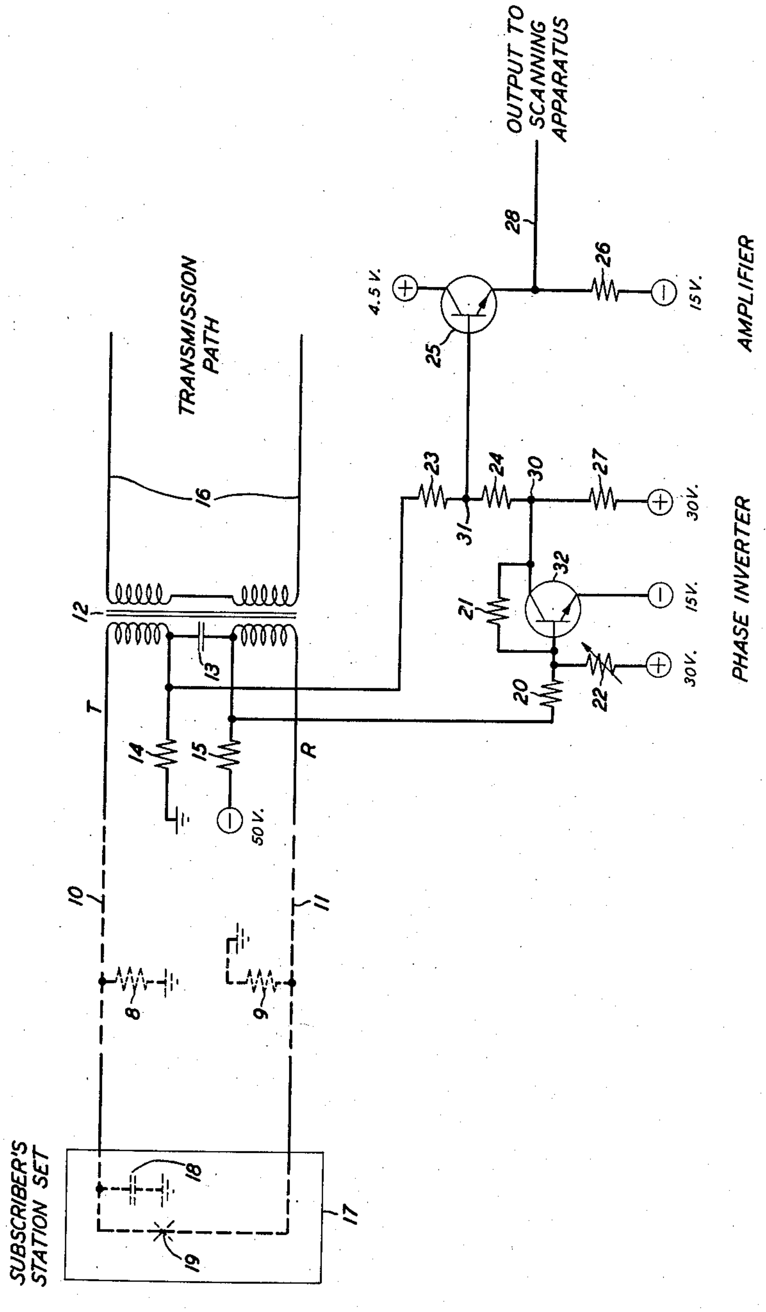
INVENTOR
H. PITLIK
BY William F. Simpson.
ATTORNEY 2,829,203

ELECTRONIC TELEPHONE SUBSCRIBER'S LINE CIRCUIT FOR NEUTRALIZING THE EFFECTS OF LONGITUDINAL INDUCTION AND LONGITUDINAL UNBALANCE

Hillel Pitlik, Morristown, N. J., assignor to Bell Telephone Laboratories, Incorporated, New York, N. Y., a corporation of New York Application November 3, 1955, Serial No. 544,784

8 Claims. (Cl. 179—18)

This invention relates to improvements in electionic sampling, testing, and distributing devices, circuits, and methods and more particularly to improved apparatus circuits and methods for scanning or sampling the voltage or potential condition of communication or telephone subscribers' lines.

In some communication systems, it is desirable to sample or scan the voltage or potential conditions of subscribers' lines at frequent intervals of time to determine the signals or signaling conditions of the line at said intervals of time. In some systems in the prior art, battery and ground or batteries of opposite polarity are connected to the two sides of a subscriber line at the central office through suitable impedance or resistor elements. One of the subscriber's line conductors or one of the impedance or resistor elements connected to the subscriber's line is then connected to an electronic scanning arrangement which periodically extends a path from said subscriber's line conductor or said impedance or resistor element to an output terminal.

Such scanning arrangements have certain shortcomings and disadvantages where the lines are subject to inductive interference fields, earth potential conditions and other disturbances and interferences including unbalanced and trouble conditions. The currents and voltages encountered on lines due to these disturbances, interferences, earth potentials, and other conditions are frequently called "longitudinal" voltages, currents, disturbances or effects. The longitudinal currents, for example, flow in the same direction in both line conductors, instead of in opposite directions, as the usual signaling, "circulating" or "transverse" currents. For example, if the side of the subscriber's line or conductor connected to ground through a resistor or impedance element becomes grounded due to some trouble or fault, and if this resistor or impedance element is connected to the scanner, then it is impossible for the subscriber to signal the central office to dial or initiate a call. Conversely, if the scanner is arranged to be connected to the other side of the subscriber's line, then a leak resistor or ground at the subscriber's station subject to earth potential of a predetermined polarity renders the subscriber's line inoperative and incapable of transmitting calling or dial signals to the central office.

Also leakage resistances from either or both of the line conductors to ground, which ground is subject to earth potential different from the ground at the central office tends to cause the potentials of both of the line conductors to become either more positive or more negative and thus interfere with the proper operation of the scanning operation and equipment.

An object of the present invention is to overcome certain of these difficulties by interconnecting both of the subscribers' line conductors through auxiliary equipment to the scanning apparatus.

Another object of the present invention is to neutralize the effects of longitudinal unbalance effects due to earth potentials, trouble grounds and the like, as well as the effects of leakage resistance to grounds which grounds are subject to earth potential.

In accordance with one feature of this invention one of the line conductors is connected through an amplifier (with approximately 180 degrees phase shift or reversal) circuit to a combining or summing circuit and the other line conductor is connected directly to the combining or summing circuit. The output of the summing circuit is connected to the scanning equipment. Thus, substantially similar voltage changes occurring on both sides of the line are balanced out and not transmitted to the scanning apparatus.

On the other hand, since the open signaling condition and the closed signaling condition applied between the two line conductors at the subscriber's station cause the voltage or potential of the two line conductors and thus a voltage or potential of the two resistor or impedance devices at a central office to change in opposite directions, such voltage changes are added together and transmitted to the scanning apparatus at the central station. Apparatus at the central office may then use these voltage indications to recognize the initiation of the calls, termination of the calls, momentary flashing of the cradle or switchhook contacts and also to determine the dial pulses transmitted from the subscriber station.

The voltage changes of the two line conductors at the central office need not be of the same magnitude so long as they are of opposite polarity and still give a proper indication of the signaling conditions of a subscriber's line. However, voltage changes of the same magnitude and polarity such as caused by the above-described and other conditions are substantially completely balanced out and not transmitted to the scanning equipment. Such voltage changes are thus prevented from interfering with the operation of the scanning apparatus or reducing the operating margins of the combined subscriber's line signaling and scanning apparatus.

The foregoing objects and features of this invention may be more readily understood from the following description when read with reference to the attached drawing which shows an exemplary embodiment of this invention.

A subscriber's station is designated 17 which subscriber's station may include the usual apparatus and equipment employed in subscribers' stations such as a transmitter, a receiver, a dial or other signaling device, switchhook or cradle contacts, a calling device, an induction coil, as well as amplifiers such as transistor amplifiers employed in telephone subscribers' station sets in the prior art. The switchhook and dial contacts are indicated at 19. These contacts complete and open a circuit between the subscriber's lines 10 and 11 at the subscriber's line station set. The circuit between these conductors at the subscriber's station set is shown in dotted form to indicate that this circuit may extend through other equipment such as dial off-normal contacts, a transmitter, the primary winding of the reduction coil, sometimes a winding of a ringing relay, etc. A condenser 18 indicated in dotted form is usually provided in subscribers' station sets and connected in the circuit with the ringers. When alternating-current earth potentials are encountered between the subscriber station set ground and the central office ground such condenser or condensers at the different subscribers' stations may cause appreciable longitudinal current to flow over the subscriber's line circuit to the central office and if the lines are scanned, as indicated above, such alternating current will interfere with the satisfactory control and supervision in the subscriber's station set and the proper recognition of pulses transmitted from the subscriber's station set to the central office.

The leakage impedances are indicated at 8 and 9 which impedances also likewise tend to interfere with the operation of this scanning equipment at the central office in case they extend to ground which has either direct-current or alternating-current earth potential between it and the central office ground.

In an exemplary embodiment of this invention the tip and ring of the subscriber's line extends through a repeat coil or transformer 12 at the central office and then to a switching network so that the subscriber's line comprising conductors 10 and 11 may be interconnected with any other desired subscriber's line. The tip conductor also extends through resistor or impedance element 14 to ground while a ring conductor extends through resistor or impedance element 15 to negative 50 volts.

Normally the cradle or switchhook contacts and/or the dial contacts at the subscriber's station are open so that no line loop current flows over the subscriber's line circuit. As a result, the right-hand terminal resistor 14 is substantially at grounded potential and the right-hand terminal of resistor 15 at a voltage of substantially 50 volts more negative than ground potential.

In accordance with the exemplary embodiment of the present invention described herein, the right-hand terminal of resistor 14, which is sometimes considered the usual scanning point or terminal, extends to a summing or combining circuit comprising resistors 23 and 24 and then through a transistor amplifier to the output conductor 28 which extends to the scanning apparatus. Typical scanning apparatus for use in combination with this invention is described in United States Patent 2,679,-551, granted to N. D. Newby, May 25, 1954, and in a United States patent application of W. Ulrich, Serial No. 391,900, filed November 13, 1953.

The right-hand terminal of the other resistor or impedance element 15 extends through a phase inverting or reversing circuit and then to the combining or summing resistors 23 and 24. The output of the combining circuit then extends to the base or control element of the output amplifier, the output of which extends to the scanning terminal.

With the subscriber's line open substantially no line current flows over the subscriber line conductors or through the resistors or impedance elements 14 and 15; as a result the right-hand terminal of resistor or impedance 14 is at substantially ground potential while the right-hand terminal of impedance or resistor element 15 is substantially the same voltage or potential as the battery connected to it which is approximately 50 volts in the exemplary embodiment shown in the drawings.

The right hand terminal of impedance or resistor 15 is connected through resistor 20 to the base of transistor 32. The base of the transistor 32 is also connected through variable resistor 22 to a source of voltage. Resistor 20 is selected to control the current flowing from the right-hand terminal of impedance 15 to the base and transistor 32 while resistor 22 is employed to control the current flowing from the positive voltage source through the base of the transistor 32. These two currents are adjusted so that the collector current causes a sufficient voltage drop across resistor 27 to bring point 30 to substantially ground potential. The resistors 20 and 22 in controlling the base current to the transistor 32 in the manner described above in combination with the voltage of the right-hand terminal of impedance 15 and the 30-volt source may be considered to comprise current sources for supplying current to the base of the transistor 32.

Thus with the subscriber's line open both the upper terminal of resistor 23 and the lower terminal of resistor 24 is substantially at ground potential. Consequently, terminal 31 is also substantially at ground potential and this potential is repeated through the transistor 25 to the output conductor 28.

Assume now that the subscriber initiates a call by closing his line which in turn causes line current flow over the tip conductor 10 and ring conductor 11 and produces voltage drops across the resistor or impedance elements 14 and 15. Under these assumed conditions the voltage or potential of the right-hand terminal of resistor or impedance element 14 becomes more negative than ground potential while the voltage or impedance of the right-hand terminal of impedance 15 becomes less negative than the voltage of the battery to which the left terminal of this resistor is connected. As a result, more current flows to the base of the transistor 32 which in turn causes more emitter current to flow in the collector circuit of the transistor. The increased collector current flows through the collector resistor 27 and causes a greater potential drop across this resistor with the result that point 30 becomes more negative than before and usually more negative than ground potential.

The feedback resistor 21 is provided to control the gain of the transistor 32 so that the operation of the circuit is substantially independent of the characteristics of the transistor 32. Resistors 20, 21, 22 and 27 are all chosen to have such values that the change in voltage of point 30 is substantially equal in magnitude to the change in voltage across the impedance or resistor 15 but in the opposite phase or opposite polarity or opposite direction.

As pointed out above, the right-hand terminal resistor 14 also becomes more negative so that the upper terminal of resistor 23 also becomes more negative. Consequently, the junction point between the combining resistors 23 and 24 also becomes more negative which voltage is repeated by the transistor 25 and applied to the output conductor 28 which extends to the scanning apparatus.

Thus, with the subscriber's line circuit open substantially ground potential is applied to the output conductor 28 and with the subscriber's line circuit closed a more negative voltage is applied to the conductor 28. These voltages are substantially the same as the voltage of the right-hand terminal of resistor or impedance 14 when this point is used to provide the scanning voltage. However, the voltage on conductor 28 is obtained both from the impedance or resistor 14 and from the impedance or resistor 15. Consequently, if the tip line conductor 10, for example, becomes grounded then still sufficient potential change appears across the resistotr or impedance element 15 due to the opening and closing of the line to apply a sufficient voltage change to the output conductor 28 to the scanning apparatus to properly and correctly indicate these voltage changes.

Likewise, should the leakage resistors 8 and 9 become sufficiently small and extend to ground potential which is different from the ground potential at the central office then current will flow from the earth potential source connected to the resistors 8 and 9 and through the impedance or resistor elements 14 and 15 in the same direction and of approximately the same magnitude, assuming the resistors 8 and 9 are of the same magnitude, with the result that voltages of opposite polarity are connected to the upper terminal of combining resistor 23 and the lower terminal of combining resistor 24 which voltages are balanced out and not applied to the base of transistor 25 and to the output conductor 28. Likewise, should the earth potential between the resistors 8 and 9 or condenser 18 and the ground at the central office comprise alternating-current voltages, these alternating-current voltages will likewise cause substantially the same alternating-current voltages across resistor or impedance elements 14 and 15. These alternating-current voltages appearing across these resistors in addition to being of substantially the same magnitude are also substantially in phase so that on the alternating-current voltage from the right-hand terminal of impedance element 15, after it is inverted or reversed in phase by transistor 32 is applied at point 30 in the manner described above. This phase inverted voltage then will substantially neutralize the voltage at the right-hand terminal of impedance element 14 so that substantially no alternating-current voltage is obtained at the central point of the combining resistors 23 and 24 and thus no alternating-current voltage is applied to the base of the transistor 25 or to the output conductor 28 extending to the scanning apparatus. Thus, such an earth potential is not applied to and does not interfere with the operation of the scanning circuits and does not affect the ability of the scanning circuits to recognize and indicate the opened and closed signaling conditions on the subscriber's line circuit.

The circuits and apparatus of the exemplary embodiment of this invention operate in the above-described manner in response to initiation of calls, termination of calls, switchhook or cradle flashing during calls and during dialing. Each time the line is closed and for the duration of the line closure a negative output voltage is obtained from the output conductor 28 and each time the line is opened, and for the duration of the open the output conductor is maintained at substantially ground potential.

Thus voltages due to longitudinal currents, unbalances, and direct-current and alternating-current earth potentials are balanced out and substantially eliminated and prevented from interfering with the operation of the scanning equipment and do not appreciably reduce the working limits or margins of the system.

It is to be understood that the above-described arrangements are illustrative of the application of the principles of the invention. Numerous other arrangements may be devised by those skilled in the art without departing from the spirit and scope of the invention.

What is claimed is:

1. In a communication system, in combination a subscriber's line extending to a central station comprising two line conductors, a subscriber's station set connected to said line for transmitting signal changes over said line conductors, an impedance element at said central station individual to each of said line conductors and extending to a source of electrical energy, a combining circuit, means for directly interconnecting one of said line conductors and said combining circuit, a reversing circuit interconnecting the other of said line conductors and said combining circuit for reversing the direction of signal changes, an output scanning terminal interconnected with said combining circuit.

2. In a communication system, in combination, a two conductor subscriber's line, an impedance element individual to each of said conductors of said line interconnected between the respective line conductors and a source of electrical energy, a combining circuit, means for continuously applying the electrical voltage condition of one of said conductors to said combining circuit, a phase inverting circuit, interconnections between said phase inverting circuit and said other line conductor and between said phase inverting circuit and said combining circuit for applying another voltage to said combining circuit under the continuous control of the voltage of said other line conductor.

3. In a communication system, in combination, a communication line comprising two conductors, an impedance individual to each of said line conductors for interconnecting the respective line conductors with a source of electrical energy, an output scanning terminal and means interconnected to each of said line conductors and apparatus for applying said output scanning terminals, said means including voltage changes to said output terminal which are the algebraic differences of the voltage changes of said line conductors.

4. In a telephone system, a telephone transmission path comprising two line conductors, a scanning terminal means for extending electrical transmission paths from both of said line conductors to said scanning terminal including means in at least one of said paths for balancing out voltages due to longitudinal currents flowing in said telephone transmission path.

5. In a telephone system, a subscriber's line comprising two line conductors, a combining circuit, means for applying voltage changes of one of said line conductors to said combining circuit, a transistor phase inverting circuit connected to said other line conductor for reversing the direction of voltage changes of the other of said conductors, means for applying said reversed voltage changes to said combining circuit, an output scanning terminal and the transistor amplifier connected between said output scanning terminal and said combining circuit.

6. In a communication system, in combination, a communication line comprising two line conductors, a combining circuit, means for directly applying voltage changes in one of said line conductor to said combining circuit, means for applying voltage changes which are substantially equal in magnitude to the voltage changes of the other line conductor but in the opposite direction to said combining circuit, an output terminal interconnected with said combining circuit.

7. In a telephone system, in combination, a telephone line comprising two line conductors, an impedance element individual to and interconnecting each of said line conductors with a source of electrical energy, a combining circuit, means for continuously conveying voltage changes of one of said line conductors to said combining circuit, an inverting circuit comprising a transistor for continuously applying voltage changes to said combining circuit which voltage changes are substantially equal in magnitude to the voltage changes of the other line conductor but in the opposite direction, an output signaling terminal, means for interconnecting said combining circuit and said output signaling terminal.

8. In a telephone system, a subscriber's line comprising two line conductors, a combining circuit, means for applying voltage changes from one of said line conductors to said combining circuit, a transistor amplifying circuit having substantially unity gain connected between the other of said line conductors and said combining circuit for reversing the direction of voltage changes of said other conductor, said combining circuit including an output terminal and means for vectorially adding said voltage changes and applying said added voltage changes to said output terminal.

No references cited.